United States Patent
Hanley (10) Patent No.: US 9,388,837 B1
(45) Date of Patent: Jul. 12, 2016

(54) TELESCOPING TUBE ASSEMBLY HAVING TWIST LOCK

(71) Applicant: Kenney Manufacturing Company, Warwick, RI (US)

(72) Inventor: Michael Hanley, Smithfield, RI (US)

(73) Assignee: Kenney Manufacturing Company, Warwick, RI (US)

(*) Notice: Subject to any disclaimer, the term of this patent is extended or adjusted under 35 U.S.C. 154(b) by 0 days.

(21) Appl. No.: 14/327,964

(22) Filed: Jul. 10, 2014

Related U.S. Application Data (60) Provisional application No. 61/844,611, filed on Jul. 10, 2013.

(51) Int. Cl.
*A47H 1/022* (2006.01)
*F16B 7/14* (2006.01)
*F16B 7/18* (2006.01)

(52) U.S. Cl.
CPC ........ *F16B 7/14* (2013.01); *A47H 1/022* (2013.01); *F16B 7/1463* (2013.01); *F16B 7/182* (2013.01); *Y10T 403/32491* (2015.01); *Y10T 403/32501* (2015.01); *Y10T 403/556* (2015.01); *Y10T 403/7067* (2015.01)

(58) Field of Classification Search
CPC ............ A47H 1/022; A47K 3/38; F16B 7/14; F16B 7/1418; F16B 7/1427; F16B 7/1463; F16B 7/18; F16B 7/182; F16B 7/187; Y10T 403/32467; Y10T 403/32491; Y10T 403/32501; Y10T 403/32524; Y10T 403/556; Y10T 403/68; Y10T 403/7067; Y10T 403/7069; Y10T 403/7077

USPC ............ 403/109.1, 109.4, 109.5, 109.8, 296, 403/343, 374.3, 374.4, 377
See application file for complete search history.

(56) References Cited

U.S. PATENT DOCUMENTS

| | | |
|---|---|---|
| 912,789 A | 2/1909 | Berbecker |
| 2,261,505 A | 11/1941 | Schlesinger |
| 2,298,380 A | 10/1942 | Hood |
| 2,915,327 A | 12/1959 | Kreske |
| 4,152,086 A | 5/1979 | Achenbach et al. |
| 4,238,164 A | 12/1980 | Mazzolla |
| 4,744,471 A | 5/1988 | Leister |
| 4,856,929 A | 8/1989 | Smahlik et al. |
| 5,427,288 A | 6/1995 | Trubee |
| 5,876,147 A | 3/1999 | Longo |

(Continued)

FOREIGN PATENT DOCUMENTS

| | | | |
|---|---|---|---|
| EP | 0793024 A1 * | 9/1997 | ............ F16B 7/1463 |
| EP | 1619397 A1 * | 1/2006 | ............ F16B 7/0413 |

(Continued)

*Primary Examiner* — Josh Skroupa
(74) *Attorney, Agent, or Firm* — C. Nessler (57) ABSTRACT

A twist-locking mechanism for two telescoping tubes, as may comprise a curtain rod, comprises a sleeve which expands outwardly as it moves along the screw of a screw body. A tapered or straight screw connects to a plain shaft portion upon which the sleeve rests when the device is in the unlock position. In another embodiment, the pitch or profile of the thread of a straight screw changes along the length of the screw, so the sleeve is forced radially outwardly as it moves from the unlock position. Split-sleeves useful in the locking mechanism have spring like features or an oblong shape, so the sleeve is biased outwardly to frictionally engage one the tube when the sleeve is at the unlock position.

20 Claims, 5 Drawing Sheets

(56) References Cited

U.S. PATENT DOCUMENTS

| | | | |
|---|---|---|---|
| 6,030,162 A * | 2/2000 | Huebner | A61B 17/1682 411/263 |
| 6,250,839 B1 | 6/2001 | Lenhart | |
| 6,302,614 B1 | 10/2001 | Tseng | |
| 6,454,506 B1 * | 9/2002 | Keller | F16B 25/0026 411/387.4 |
| 6,527,777 B2 * | 3/2003 | Justin | A61B 17/863 411/310 |
| 6,862,776 B2 | 3/2005 | Chen | |
| 8,215,863 B2 | 7/2012 | Sohn | |
| 2006/0204322 A1 | 9/2006 | Roiser | |
| 2010/0316438 A1 | 12/2010 | Sohn | |
| 2012/0005823 A1 | 1/2012 | Baines | |
| 2012/0152872 A1 | 6/2012 | Didehvar | |
| 2012/0241399 A1 | 9/2012 | Trettin | |
| 2012/0261371 A1 | 10/2012 | Baines | |
| 2012/0284914 A1 | 11/2012 | Bauer | |

FOREIGN PATENT DOCUMENTS

| | | | |
|---|---|---|---|
| EP | 1748196 A1 * | 1/2007 | A45B 9/00 |
| GB | 2 400 813 | 10/2004 | |
| JP | 2000046021 | 2/2000 | |
| WO | WO 2009039578 A1 * | 4/2009 | B25G 1/04 |

* cited by examiner

FIG. 15

TELESCOPING TUBE ASSEMBLY HAVING TWIST LOCK

This application claims benefit of provisional patent application Ser. No. 61/844,611 filed on Jul. 10, 2013.

TECHNICAL FIELD

The present invention relates to adjustable length rods comprised of telescoping tubes, useful for hanging curtains and the like at architectural openings in structures, and for other applications.

BACKGROUND

Curtain rods which are sold for domestic use fit different sizes of window, door and other openings. Commonly, rods have been adjustable within large and small limits, The present invention relates to curtain rods comprised of round hollow tubes, where one part telescopes within the other part, so the length is adjustable to fit a window or door opening, generally referred to herein as an architectural feature. Many such prior art rods run between opposing side brackets. The brackets may be screwed or nailed to the opposing sides of the frame of the opening. However, for convenience of installation, and to avoid damage to the frame, curtain rods have heretofore been held in place by means of frictional engagement of the rod ends with the opposing sides of a window frame or the like. It follows that there must be means for exerting sufficient force against the window frame surfaces, so the weight of the rod and any associated curtain or other window treatment is supported by frictional engagement; and, that means must be compatible with the need for having adjustable length of the rod.

Another need is that a curtain rod of the foregoing type should be suited for easy installation by an average householder without the use of tools. While there are various designs which are previously known for accomplishing the needs, including those which include tubular rods which have internal springs or mechanical locking mechanisms, there is a continuing need for improved designs which have a better combination of simplicity of installation, good functionality, and economy of manufacture.

In the present invention twisting of one tube relative to the other tube locks the assembly at a particular length. An internal locking mechanism which is connected to the end of the smaller diameter tube expands radially outward and jams against the bore of the larger tube to thereby frictionally lock the tubes to each other. Reversing the direction of the twist loosens the connection. Thus, a curtain rod can be installed at a window opening or frame, to fulfill the needs and functions described above. In known twist lock devices, a sleeve travels along a tapered screw and expands radially outward, for example, as shown in U.S. Pat. No. 5,876,147 of Longo and of U.S. Pat. No. 6,302,614 of Tseng.

Among the problems associated with prior art devices is that the locking sleeve in its relaxed or loosened position does not well-engage frictionally the bore of the larger tube, as is necessary to initiate the tightening process. Another problem is which the present invention seeks to solve is that when a user mistakenly twists the tubes in the loosening direction, the sleeve can become jammed at the small end the tapered screw, causing what is called here false locking. Such wrong-way tightening can even cause the locking mechanism to fracture. A still further problem is that a over-zealous user can over-tighten the locking mechanism, making it difficult to subsequently release.

The foregoing problems can be presented in locking mechanisms used for telescoping tube assemblies for applications other than curtain rods, for instance, adjustable height stands. Thus, there is a need for further improvements in locking mechanism designs that are used with telescoping tube used for curtain rods and other applications.

SUMMARY

An object of the invention is to provide a telescoping curtain rod, with an associated locking mechanism that has good frictional engagement with different size window frames, which rod is reliable in providing locking. The rod and locking assembly should be simple to use and economical to make. A further object is to provide a telescoping curtain rod which can be adapted to either pushing or pulling on the edges of a frame, according to whether its primary engagement is with the inward or outward edges of the frame. A still further object is to provide a locking mechanism for telescoping tubes, for use in curtain rods and other applications, which is not subject to jamming when over-tightened, or which do not falsely lock when twisted in the wrong direction.

In accord with the invention, telescoping tube assemblies have twist locking mechanisms which comprise a screw body that is attached at its drive end to the smaller of the telescoping tubes. A sleeve around the screw of the screw body is translated lengthwise and simultaneously expands radially outwardly, so it ultimately jams against the bore of the larger telescoping tube, locking the tubes to each other.

In an embodiment of the invention, a twist locking mechanism comprises a screw body which has a tapered or straight thread screw which is connected by a plain shaft portion to the driven end of the screw body, which is the home position of the sleeve. That feature that avoids any unwanted false jamming and associated failure of the screw body when the user mistakenly turns the telescoping tubes in the un-lock direction. There may be a tapered transition section between the plain shaft and the screw. The screw may be tapered or straight.

In another embodiment of the invention, the thread of the screw changes in pitch or profile along the length of the thread. Thus, when sleeve is force radially outwardly as it translates along the screw, which is preferably straight but may be tapered. This feature lessens the extent to which the mechanism will become bound up due to over-zealous tightening.

In further accord with the invention, sleeves have different constructions, including a split sleeve with spring like members in vicinity of a living hinge or in vicinity of the split, opposite the living hinge; an oblong cross section sleeve; and a sleeve with a single turn thread.

The foregoing and other objects, features and advantages of the present invention will become more apparent from the following description of preferred embodiments and accompanying drawings.

DESCRIPTION

The present invention relates to commonly owned U.S. patent application Ser. No. 13/420,937, filed Mar. 15, 2012. The entire disclosures of the foregoing and provisional application 61/844,611 filed on Jul. 10, 2013 are hereby incorporated by reference. The related '937 application describes a twist lock embodiment like that shown in FIG. 1 and FIG. 2 of this application, where a screw body which carries a sleeve has a constant pitch threaded portion that tapers from a large end to a small end. In the present invention includes improvements in the design of the screw body and its function in locking and unlocking the telescoping tubes together, along with improvements in sleeve construction.

Figure 1:
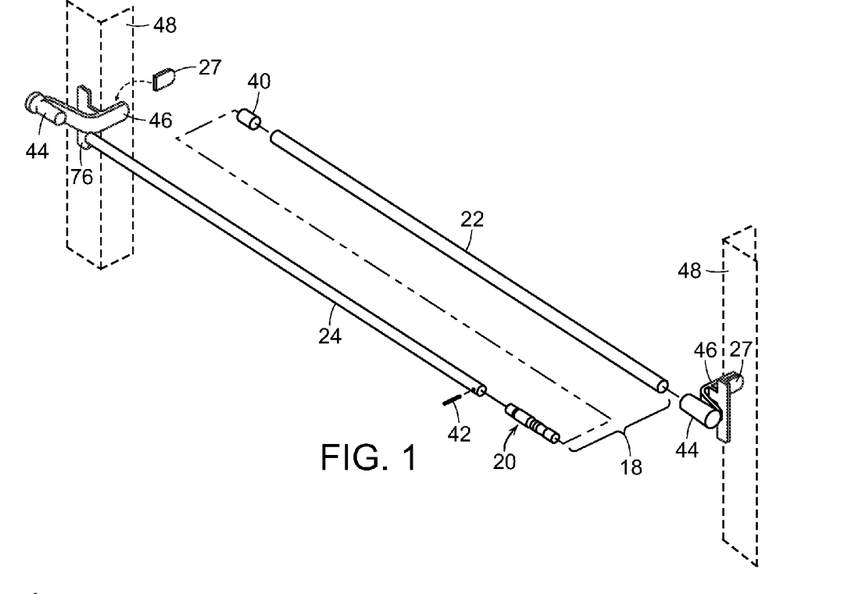
FIG. 1 is an exploded perspective view of a telescoping tube curtain rod assembly in working position at the opening of a window frame shown in phantom, where the ends of the curtain rod press outwardly on the window frame.

FIG. 1 is an exploded view of an embodiment of curtain rod assembly 18 in accord with the present invention. The assembly runs between mounting brackets which fit within, and press against, the opposing side vertical frames of a window opening or the like, shown in phantom. The curtain rod assembly is comprised of two mutually telescoping tubes 22, 24 and a locking assembly 20. When the tubes are twisted relative to one another, the locking mechanism holds the tubes in a fixed length telescoped position. During the locking process, the locking mechanism preferably exerts a thrust (lengthwise-outwardly in the FIG. 1 embodiment). A reference herein to the "rod" or "curtain rod" is a reference to the rod assembly. The invention is useful in connection with architectural openings in structures, of which a window opening is an example. In a typical use, a user will hang a curtain or other window treatment from the rod assembly. The invention is useful for supporting shower curtains, including in telescoping tube assemblies which comprise curved portions. A window treatment may include such as fabrics, both opaque and shear, blinds, drapes, shades and the like. While brackets are commonly used because they provide desirable spacing of a rod relative to a frame or opening, in the generality of the invention the ends of the tubes which would engage brackets can alternatively be configured or adapted for to direct engagement of the tube ends with an architectural feature such as the opening of a window frame. For example, the ends of the rods may be fitted with rubber caps.

To keep the curtain rod 18 shown in FIG. 1 in place against gravity and weight of a curtain, there must be an outward or thrusting force applied to the frame by having the ends of the tubes press on the brackets, in the absence of screws. The force must be sufficient to create a frictional engagement between the brackets and frames that is sufficient to resist the expected downward forces. That is accomplished by creating resilient forces in the rod assembly and associated brackets that are sustained after the rod assembly is locked and in place relative to a window frame. Even when the brackets are attached to the structure it is necessary to avoid the rod shrinking in length with time and use.

In the apparatus shown in FIG. 1, opposing side brackets 46 have outward-facing right angle vertical surfaces for engaging window frames 48, shown in phantom. Each bracket 46 has a socket 44, within which is received the outer end of one of the hollow tubes 24, 22. Alternatively, each bracket may have an inward-projecting cylindrical stub, not shown, on which is received the hollow end of a tube. "Inward" as used herein without qualification generally refers to a direction which runs to the center of the window frame or other opening in which a curtain rod is installed for use. Brackets 46 may be made of molded plastic; alternatively, of metal of other material. Thin pads 27 of elastomeric material such as rubber are preferably interposed between each bracket and the inward facing surface of the frame 48, e.g., to enhance frictional engagement and accommodate irregularities. Alternately, each bracket may have small protuberances which press into an accommodating frame surface. Tubes 22, 24 may be optionally fastened to the brackets if desired, as by screws, pins, press fit, adhesives, etc., to ease placement of the assembly.

Tubes 22, 24 may be made of lightweight steel tubing of about $5/8^{th}$ inch to 1 inch diameter with a wall thickness of about 0.02 inch; alternatively they may be made of aluminum or a strong plastic. The outside diameter of tube 24 is slightly smaller than the inside diameter of tube 22, for example about 0.010 to 0.040 inch smaller. When assembled, the inner end of smaller tube 24 is slidable lengthwise within the inner end of the larger tube 22. The fit between the tubes is close, so any bending at the joint between the tubes is minimized.

Figure 2:
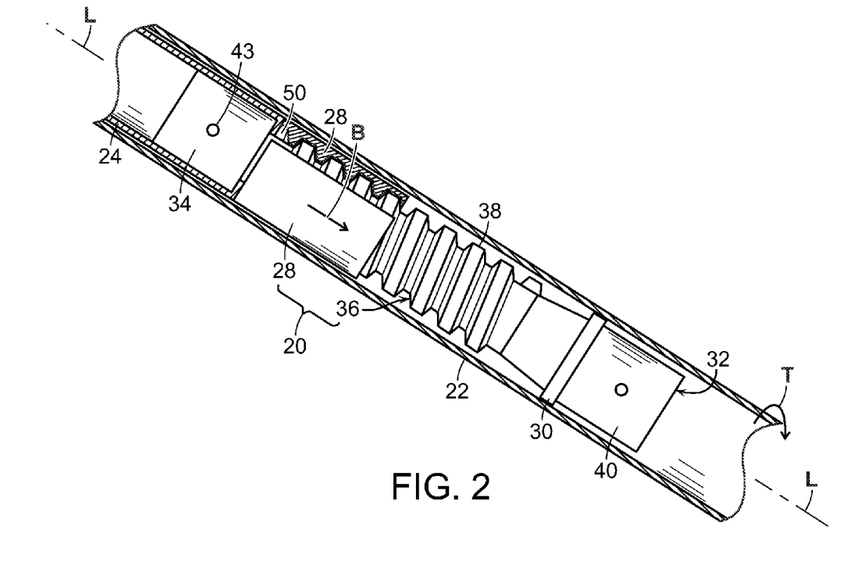
FIG. 2 is a side view of a locking assembly in its working position within the rod assembly of FIG. 1, with the tubes cut away in cross section.

When installed in a window frame, the tubes 22, 24 lock lengthwise relative to each other by means of locking assembly 20 which fits within the cylindrical interiors of the assembled tubes 22, 24. With reference to FIG. 2, exemplary locking assembly 20 is comprised of a screw body 36 and an internally threaded sleeve 28 which fits around the screw body. A preferred sleeve is a resilient compressible material. Both the screw body and sleeve are preferably made of a molded plastic such as polypropylene or nylon. Other materials are mentioned below. The internal threads of sleeve 28 engage the external thread 38 of the screw body 36; and as pictured, the thread is tapered. Sleeve 28 may have the preferred construction shown in FIG. 11 and FIG. 11A, discussed below.

With reference to FIGS. 1 and 2, when tubes 22, 24 are rotated relative to each other, screw body 36, being rotatably fastened to tube 24, rotates about longitudinal axis L-L of the assembly relative to tube 22 and relative to sleeve 28 which is frictionally engaged with the bore of tube 24. When the screw 38 of an exemplary device is a right hand thread, clockwise motion (as gauged by looking at end 34, and as indicated by arrow T) causes the sleeve to move to the right (indicated by arrow B) relative to the screw body, and toward the increasing diameter end of the threaded portion 38, i.e., toward end 32 of the screw body. As sleeve moves toward the increased thread diameter portion of the screw body, it is increasingly expanded in diameter and pressed outwardly against the bore of tube 22, finally reaching the point where there is jamming force between the screw body, the sleeve and tube 22. At that point the tubes are locked lengthwise and rotatably to each other. This action is referred to as tightening or locking of the assembly. Twisting the tubes in the reverse direction will loosen the assembly and is referred to as releasing or unlocking of the assembly/locking mechanism.

To describe the rod assembly more particularly: Screw body 36 has a first end 34 which fits within the end of smaller tube 24 and a second end 32 with fits within larger tube 22. The end 34 fits closely within tube 24 and is engaged with it in a way such that rotation of tube 24 rotates the screw body. For this reason end 34 may be called the drive end of the screw body in the FIG. 2 embodiment. (As described below, in other embodiments of the invention, the locking assembly may be rotated end-for-end within the tube assembly and then end 32 will be the drive end.)

Figure 8:
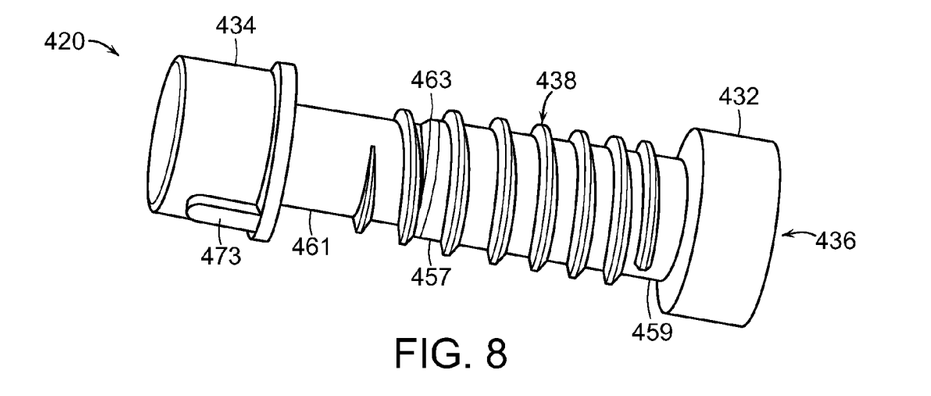
FIG. 8 is a perspective view of a screw body like that illustrated by FIG. 6, with a straight threaded portion that has a decreased pitch at the end which is distant from the drive end.

As shown in FIG. 1 and FIG. 2, engagement of drive end 34 with tube 24 may be accomplished by roll pin 42 which fits within hole 43 of the screw body end. Alternative means for connecting the two parts may be used. For example, as shown in FIG. 8, end 434 may have one or more lobes 473, which slide into opposing side slots of the end of the tube (not shown). Other means for rotatably connecting the screw body to a tube may be used, including other fasteners, dimpling, swaging, keyway and slot, adhesives, etc.

The opposing cylindrical end 32 of screw body 36 is received within the inner end of larger hollow tube 22. Preferred end 32 is comprised of flange 30 and smaller diameter portion 40. Flange 30 fits closely the bore of tube 22. To fit closely means that the diameter of the inner piece, e.g., flange 30, has a slip fit with the bore of the receiving piece, e.g., tube 22. The fit of the end 32, in particular flange 30, and tube 22 is such that they may rotate relative to each other, and that end 32 can slide lengthwise within the bore of tube 22. When the parts of the assembly are arranged as shown in FIG. 2, there is an outward thrust as the tubes are tightened to their maximum. As described fully in the related application, when the screw body is rotated end-to-end within the tubes, to make an alternative rod assembly, there is instead an inward pulling simultaneous with the end point of the jamming or locking action. That is useful when the brackets engage the exterior edges of a window frame. If the reversible feature is not wanted, then the whole of the end 32 may have the diameter of flange 30 or the diameter of portion 40. In another embodiment, the end 32 may be absent. See FIG. 8-10 and related discussion.

Sleeve 28 has a threaded bore, the internal threads of which engage the external threads of screw 38 of screw body 36. In the embodiment shown in FIG. 2, sleeve 28 is split lengthwise. Sleeve embodiments are discussed further below. As mentioned, the screw 38 of screw body 36 is tapered and thread diameter increases with increasing distance from drive end 34 and tube 24.

In one exemplary assembly, the screw or threaded portion of an exemplary screw body is about 1.4 inch long and the large end minor diameter is about 0.35 inch. An associated sleeve may be about three quarters of an inch long. The thread of the screw and has an about one-quarter inch pitch and a 1 to 4 degree included angle taper, preferably about 1 degree. Smaller tapers desirably provide more desirable extent of thrusting as the locking action is accomplished. On the other hand smaller tapers necessitate longer locking mechanisms and more material. The shape of the taper may vary within the invention. For example, the taper may fit a regular cone; or the taper may fit a curved cone, or the smaller end of the screw (nearest screw body end 34) may be constant diameter. The fit with each other of the mating threaded parts 28, 38 of the FIG. 2 embodiment, and of their analogs in other embodiments, is sufficiently loose to enable the motions which are described herein.

The outside diameter of sleeve 28 is dimensioned so that, when the sleeve is mounted on the screw body and inserted within tube 22 with the sleeve in its home position (that location which is nearest to the end 34), at least part of the sleeve exerts a light resilient outward force against the bore of the tube 22, sufficient to cause the sleeve to rotate about the screw body when the tube 22 is rotated relative to the screw body. Yet, the fit of sleeve and tube is sufficiently loose to also allow the sleeve to move lengthwise within the bore of the tube. With sufficient turning or twisting, the sleeve translates along the screw and becomes wedged in place as it moves toward the larger end of the tapered screw 38.

The desired fit and frictional engagement between the sleeve at its home or unlock position and bore of tube 22 may be achieved by different means. For instance, the fabricated shape of the sleeve may create a light interference fit with the bore; the sleeve may be elastically loaded so it springs outwardly against the bore; part of the sleeve may be preferentially pressed against the bore, either due to the shape of the sleeve or because an end of the sleeve is thrust outwardly by the thread taper in its home position, as shown in FIG. 11 of the related application. Further improvements in sleeve construction are discussed below.

As sleeve 28 moves along the screw toward its lock position, the frictional engagement of the sleeve with the bore of the large tube exerts a lengthwise thrust to the larger tube. This is desirable, since it presses the brackets against the sides of the window opening, taking up any play which the installer of the rod may have allowed between the brackets and the opening and between the rod ends and the brackets, as well as elastically deforming the brackets to the extent they are compliant.

The forces which cause frictional engagement between the sleeve and tube will also create a frictional force between the sleeve and the screw of the screw body. The frictional forces coupled with distortion of resilient plastic parts of the device inhibit un-turning or counter-rotation of the parts. On the other hand, a user can overpower those frictional forces by reversing the twisting motion associated with tightening, and thus can loosen the locking assembly and remove the curtain rod from its locked-in position. However, with a tapered screw, the more the user twists the tubes, the greater the jamming force of the sleeve, as it is forced into a smaller and smaller space—and that can reach a point where unloosening can become difficult.

Figure 4:
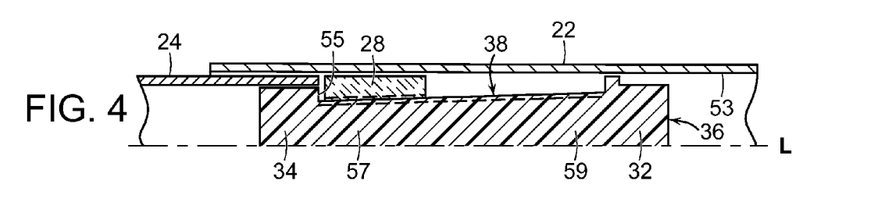
FIG. 4 is a simplified and semi-schematic lengthwise cross section through the locking assembly of FIG. 2.

FIG. 4 is a somewhat simplified or schematic half-cross section of a portion of the assembly shown in FIG. 2. The threads of the screw in this and the following Figures are shown by a dashed line. Screw 38 has a first end 57, where it connects to the cylindrical cross section screw body end 34 (which may also be referred to as the drive end), and a second opposing larger end 59 which connects with cylindrical screw body end 32. Sleeve 28 is shown in simplified fashion; the internal threads are present but not always illustrated, to provide clarity of other features. As discussed below, the end 32 of the screw body may be omitted in alternative embodiments of the invention.

Figure 5:
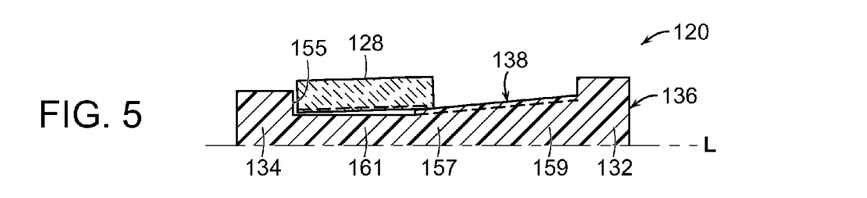
FIG. 5 is a simplified and semi-schematic lengthwise cross section of a locking assembly comprised of a screw body and sleeve, where the screw body has a tapered threaded portion and an unthreaded shaft portion.
Figure 6:
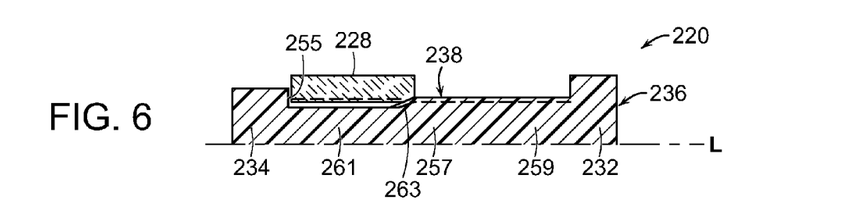
FIG. 6 is a simplified and semi-schematic lengthwise cross section of a screw body and sleeve, where the screw body has a straight threaded portion and an unthreaded shaft portion.
Figure 7:
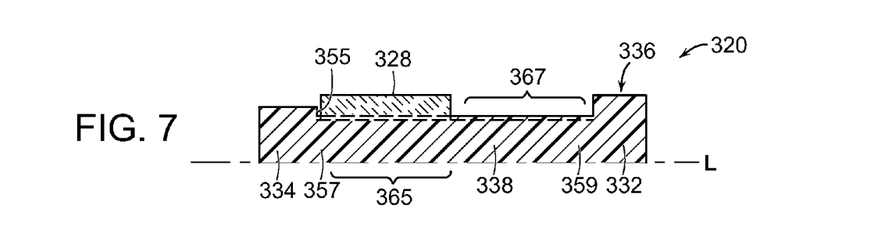
FIG. 7 is a simplified and semi-schematic lengthwise cross section of a screw body and sleeve, where the screw body has a screw comprised of a straight threaded portion having two different pitches.
Figure 9:
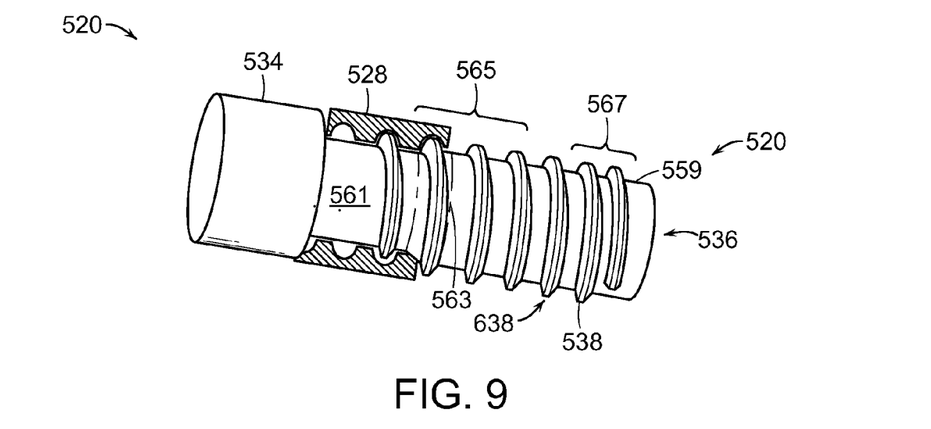
FIG. 9 is a perspective view of a screw body like that of FIG. 8, with addition of a sleeve and absence of a larger diameter cylindrical end.

The drawings of FIGS. 5-7 have the same style as FIG. 4, but the tubes are eliminated for simplicity of illustration. Elements which are related to each other in FIGS. 4-7 have numbers with the same last two digits. FIGS. 8-9 are perspective views of screws like those of FIG. 5. All the FIGS. 4-7 illustrate assemblies in which the final locking action has an associated thrusting outward of the tubes, which is desirable with the brackets engage the inside surfaces of an architectural opening, as pictured in FIG. 1.

Figure 5A:
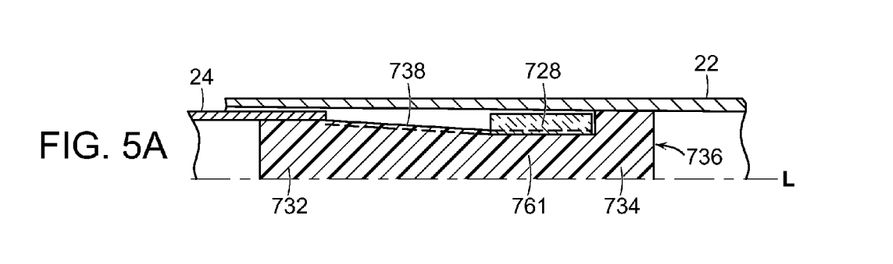
FIG. 5A shows a locking assembly comprised of screw body and sleeve like those of FIG. 5, but with the orientation of the locking assembly within the telescoping tubes reversed, to cause pulling together of the tubes, compared to pushing apart.

In the FIGS. 4-7 embodiments of locking assemblies 120, 220, 320, when the sleeve moves along the screw to the right in the Figures, the sleeve expands radially outwardly and jams against the bore of the larger tube, to put the assembly in the locked position. Alternative assemblies may be constructed, where the orientation of the screw body is reversed, so that upon jamming there is a slight pulling together of the tubes, or shrinking in length of the rod assembly. FIG. 5A shows by example how the assembly of FIG. 5 can be re-oriented to cause pulling together as the locking action is completed. FIG. 5A is discussed further below.

Figure 3:
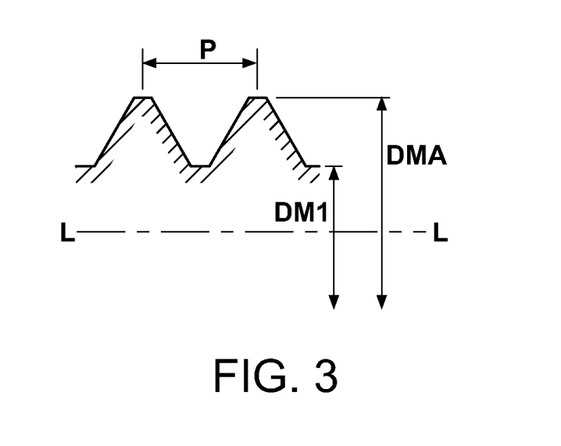
FIG. 3 is a lengthwise cross section of Unified American Standard threads.

FIG. 3 is presented to illustrate thread terminology. It is a partial lengthwise cross section through a thread of a screw having an American Standard Unified thread form. The thread has a pitch P, a minor diameter DM1, and a major diameter DMA. As visually apparent from FIG. 8-10, preferred embodiments do not use the standard thread, but the terminology is still applicable. An exemplary form of thread which is preferred in the present invention is shown in FIG. 3A.

Figure 3A:
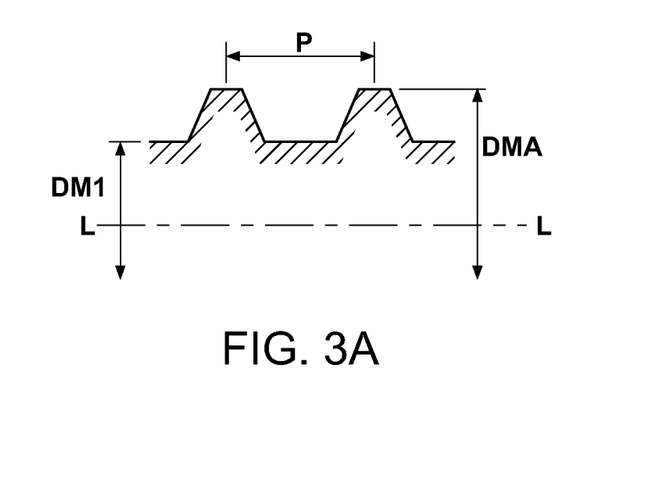
FIG. 3A is a lengthwise cross section of threads used in the invention.

With reference to FIG. 3A, an exemplary constant pitch thread, which may be used on screws 238, 438 of screw bodies 236, 436, has a major diameter DMA of about 0.442 inch, a minor diameter DM1 of about 0.320 inch, and a pitch P of about 0.25 inch. As discussed below, in a preferred embodiment, the pitch varies along the screw length. Other thread configurations may be used in carrying out the invention.

FIGS. 5-6 illustrate different locking assembly embodiments of the present invention. In each, the rod assembly is locked when the sleeve moves from an unthreaded shaft portion (the unlocked position) and onto a threaded screw portion. FIG. 5 shows a tapered screw. FIG. 6 shows a straight (constant diameter) screw which may or may not have a pitch or profile which changes along the screw length, as discussed below.

With reference to FIG. 5, the central part of screw body 136 has a tapered screw 138 which connects to an unthreaded shaft 161 which is connected to the drive end 134 of the screw body. The location of the joining point of the two portions 138, 161 of the body may vary, according to the length of the sleeve and the length of the taper thread portion. Screw body 136 has ends 132, 134. The screw 138 has a large end 159 which is attached to screw body end 132, and a small end 157 near the middle of the screw body, which is connected to unthreaded shaft 161. One end of the threaded bore of the sleeve is barely engaged with the small end of the screw 138. Thus, when the tubes are appropriately twisted the sleeve will be pulled along the thread toward the large end 159, thus becoming increasingly engaged with the thread. The taper of the thread causes the sleeve to expand outwardly, achieving the desired locking action.

By way of reference, and to provide context: In the embodiment of FIG. 4 (and associated FIG. 2), when the user twists the tubes in the unlock direction, sleeve 28 will be thrust against the shoulder 55 of end 34. That will tend to cause the sleeve to deform radially outwardly and jam against the bore 53 of the larger tube, producing what is called here false locking. That is, the user will conclude falsely that the assembly is locked as intended by the manufacturer. While there is a locking, it is inferior to that which results when the sleeve is moved to the larger end of the taper screw, as the design intends. Also, the desired thrusting-upon-tightening has not been achieved. Furthermore, the nature of the sleeve jamming—against the shoulder 55—can cause the screw body to fracture due to tensile overload.

In comparison, when the assembly 120 has a sleeve to the far left in FIG. 5, where the sleeve is in its home or rest position, if the tubes are rotated in the "wrong direction"—in a direction which would tend to cause false locking, there is no jamming against shoulder 155 for two reasons. First, the lack of thread on portion 161 and the slight engagement of the sleeve with the thread results in relatively little thrusting force toward the drive end. Second, any "scrunching up" of the sleeve due to action of threads at the small end of the screw 138 is insufficient to cause false locking engagement of the sleeve with the bore of the tube. The smallness of the thread diameter at the small end of screw 138 means any radial expansion is insufficient to jam the sleeve forcefully against the bore of the larger tube. Since the false locking is avoided, the risk of attendant fracture failure of the screw body is avoided.

With reference to FIG. 6, screw body 236 of assembly 220 has a step near its mid-point, where a first diameter mostly-unthreaded portion of screw body connects to larger, constant, diameter threaded portion. The body 236 has a drive end 234 and an opposing end 232. Screw 238 has a first end 259 connected to body end 232 and a second end 257 which is in the center portion of the screw body. Transition section 263 connects the inner end 257 of screw 238 to cylindrical shaft 261, and thus indirectly to body end 234. Transition section 263 is preferably cone-like as shown. The thread of the screw runs along the taper of transition section 263 and vanishes as it runs onto the unthreaded shaft 261. This is more clearly illustrated by FIG. 8-10. One end of the threaded bore of sleeve 228 is engaged with the thread at the taper section 263; optionally the sleeve may be additionally engaged with part of the thread at the inner end 257 of screw 238. Thus, when the tubes are appropriately twisted, the sleeve will be pulled up the thread toward the large end 259 of screw 238, thereby expanding for locking action. That locking action is preferably abetted by the change in pitch or profile of the thread, as described below. For the same reason as described in connection with the FIG. 5 embodiment, there is no consequential jamming of sleeve 228 against shoulder 234 and no consequential false locking when the assembly is over-turned in the unlock direction.

FIG. 5A shows a locking assembly comprised of screw body 736 in combination with sleeve 728, with an orientation with the assembly of tubes 22, 24 that causes pulling together of the tubes upon the final tightening of the locking assembly. Such action can be desirable when the tubes are part of a curtain rod assembly that engages the exterior surfaces of a window frame. Screw 738 and straight shaft portion 761 are like the parts 138 and 161 of FIG. 5. But compared to the assembly of FIG. 5, the taper of screw 738 increases with proximity to end 732 which is engaged with the small tube 24. It will be appreciated that the locking mechanism of the FIG. 6 embodiment and other embodiments described herein can similarly be reversed in orientation to achieve the same kind of pulling effect.

A sleeve of the present invention may have alternative configurations which are more particularly described below. A sleeve is preferably made of a resilient plastic material, in particular polyurethane having s Shore A Durometer of about 85 or comparable elastomeric material. Other materials, such as polyvinylchloride (PVC), polyoxymethylene (POM), and Delrin acetal plastic may be used. A feature of the embodiments of FIG. 4 and FIG. 5 is that false locking is avoided when the tubes are twisted in the wrong direction. While a sleeve preferably has a essentially circular cross section part like the C-shape cross section sleeves described herein, sleeves which are functionally equivalent to such, for instance a sleeve comprising two or more separate segments may be used.

While the illustrations of FIGS. 5-6 show a transition region between the screw and the unthreaded shaft located near the center of the portion of screw body, it will be understood that different proportions may be used in carrying out the invention, particularly so the transition region is located nearer to a drive end, for example end 234. The desired proportions of the elements and location of the transition zone will be related to the length of the sleeve which is used.

In the embodiments of FIG. 5 and FIG. 6 and other embodiments having the same inventive features, the unthreaded section 161, 261 preferably is substantially cylindrical. In the generality of the invention other cross sections may be used, for instance polygon and oblong cross sections. While the surfaces of sections 161, 261 are preferably smooth, in alternate embodiments of both assemblies 120 and 220, the shaft portion 161, 261 may have a thread running the whole length, where the thread profile is like a vestigial profile, that is, the thread height is small and insufficient to engage the threads of the sleeve in a way which is consequential to jamming the sleeve against the shoulders 155, 255. Such a shaft which has features which are insubstantial insofar as engaging the threads of the sleeve in a way which jams it against the shoulder near the drive end of the screw, are considered equivalent to a wholly unthreaded, or plain, shaft, in the present invention.

While a conical or other shape transition section, such as section 263, is desired, in alternate embodiments of the invention, the transition section may be simply a step at the inner end of the screw where it is connected to the plain shaft.

FIG. 8 and FIG. 9 show embodiments of locking assemblies 420, 520 having screw bodies 436, 536 which are much like screw body 236 of FIG. 6. Both Figures show a preferred decrease in thread pitch with distance from the drive end 434, 534. With reference to FIG. 8, first end 434 of screw body 436 is shown with a lobe 473, for engaging a slot in the end of a smaller diameter tube. The center portion of the screw body comprises a mostly unthreaded shaft 461 which connects to taper transition section 463, which connects to straight screw 438. Preferably, as shown, the thread of the screw runs across section 463, to vanish on the cylindrical section 461. Preferably, the pitch of the thread gets smaller as it nears the screw end 459 and connected screw body end 432.

FIG. 9 shows a locking assembly 520 which has a construction much like the locking assembly 420 of FIG. 8. Screw body 536 has no end portion corresponding with end 432. Screw body 536 is shown with cut-away sleeve 528. The first end 534 of the screw body 536 comprises a mostly smooth straight section 561, transition section 563, and constant diameter screw 538. Screw 538 has a first portion 565, near the middle of the screw body, where the thread has a first pitch; and there is a second portion 567 of the screw, near the end 559 of the screw body, which has a thread with a smaller second pitch. The thread in the bore of sleeve 528 matches the first pitch. Thus, when the sleeve runs along the screw toward the end 559 of the screw, the change in pitch causes the sleeve to expand radially outwardly, jamming the sleeve against with the bore of the tube and inhibiting movement of the sleeve off the end of the screw. For example, the pitch may change progressively from an initial about 0.25 inch pitch to a 0.1 inch pitch. In another alternative, the pitch changes abruptly or in step fashion. Decrease in pitch means there are more threads per unit length and thus more volume is occupied by the male threads of the screw than is provided for in the groove space of the female thread of the sleeve. Furthermore, there is an interference type of action owing to the mismatch of the pitches. Thus, the sleeve is thrust radially outwardly.

Alternatively to, or in combination with, the pitch change, the profile of the thread (i.e., the cross section of the thread as shown in FIG. 3A) may increase with location along the length of the screw in the same way as pitch decreases. Thus, when the sleeve moves onto the portion having an increased profile thread, it is forced radially outwardly owing to the mismatch in fit between the threads on the sleeve and the threads on the screw body. In essence the density or volume of space occupied by the thread increases along the length of thread, forcing the sleeve to deform outwardly to the extent it can. When the force imparted by twisting is insufficient to move the sleeve further, and at that point the rod assembly is said to be fully locked position.

When there is appropriate sizing of the sleeve and decreasing pitch or increasing profile of the screw thread, the sleeve cannot run off the end of the screw because of the resultant jamming; thus it is possible to avoid the need for an end like end 432 to retain the sleeve. Nonetheless, it still might be desirable to have an end like end 432 of FIG. 8; for example, an end can provide stability to locking assembly and to the telescope joint between the tubes, when accomplishing such is desirable; and, as with the embodiment of FIG. 2, it can provide the option for reversal of the screw body in a tube assembly. Having an end 432 can also be useful for retaining a sleeve in place on the screw during handling of locking mechanisms during manufacturing and assembly of products.

Figure 10:
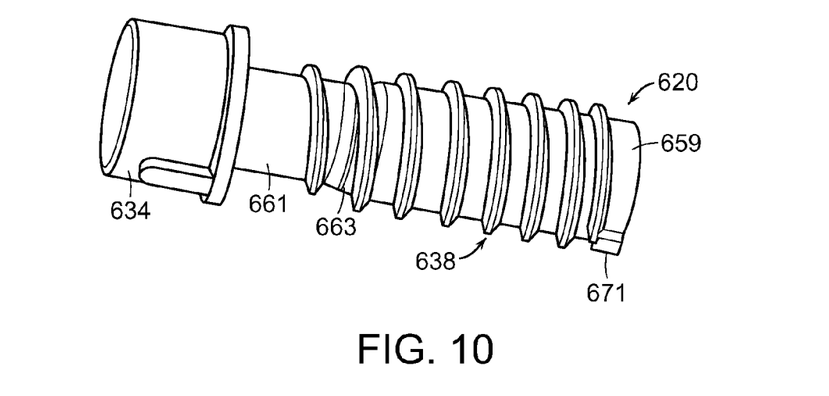
FIG. 10 is a perspective view of a screw body having a constant diameter and constant pitch screw thread with a stop at the end of the thread.

FIG. 10 shows screw body 636, an embodiment which has features like screw body 536, including first end 634, smooth section 661, transition section 663 and screw 638. Screw 638 has a constant pitch thread. At end 659 of the screw, the thread terminates at stop 671, a molded in pad that impedes further motion of the sleeve along the screw.

FIG. 7 shows another invention embodiment. Screw body 336 has opposing ends 334 and 332, between which runs a constant diameter screw 338 having ends 357 and 359. The screw has a first section 365, near end 357, where the thread has a first pitch, which pitch matches the pitch of the internal threads of sleeve 328. The screw second section 367, which is furthest from the first end 334, also called drive end 334, has a pitch which progressively decreases from the first pitch to a second smaller pitch at screw end 359. The change in pitch or profile causes jamming of the sleeve with the bore of the larger tube, as the sleeve moves toward the end 332.

In one variation of the FIG. 7 embodiment, the sleeve jams against the shoulder 355 and that is accepted, particularly in the context that the screw 338 does not have a weak small end. In another variation, the threads in the portion 365 are made suitably small in profile so that there is only weak engagement with the female threads on the bore of the sleeve, and thus there is not sufficient force to cause jamming.

In alternative embodiments of the invention in which the screw has a pitch change, the pitch may increase with distance from the un-lock end of the screw body, rather than decrease. In such situation, the mismatch between the threads of the screw and the threads of the sleeve make the sleeve threads ride up on to the threads of the screw, thus causing outward thrusting of the sleeve. A decrease in pitch is preferred because, as mentioned, there is not only a mismatch but there is more volume of male thread per unit length.

The foregoing pitch change and profile change ways of forcing the sleeve radially outwardly may be applied to screws which are tapered, for example, to screw bodies 36, 136, 236 and other variations of the invention shown and unshown here.

To summarize, a screw body may comprise a screw which is straight or tapered in combination with a shaft which spaces apart the screw from an end of the screw body. The shaft may be a plain smooth shaft, a shaft which has a diminishing thread running from the small end of the screw, or a shaft which has threads that are small so that they insufficient to well-engage the threads of the sleeve. When the screw is straight, there may be a transition section connecting the screw to the shaft, which transition section may be tapered and threaded, or it may be a step. The threads of the screw may change in pitch or increase in profile with distance from the shaft portion. Preferably, the change in pitch will be a decrease in pitch. In another embodiment, there is no shaft portion, the screw is tapered and the threads may change in pitch or profile at the larger end of the screw. In another embodiment, the screw is straight and at one end of the screw body (the home or unlock end) the threads match closely or loosely the threads of the sleeve; while at the other lock end of the body, the threads have a larger thread profile change pitch, preferably decreased pitch. A feature of the invention embodiments having a straight screw, compared to having a tapered screw, is that, once locking has been achieved, continued turning—and what might be called "over-jamming" is present to a lesser extent than when the tapered screw has an unchanging thread. Thus, a user is less likely to find that the tube assembly cannot be conveniently unlocked.

Sleeves which are constructed in accord with the related application Ser. No. 13/420,937 may be used in the present invention. Preferred sleeves are now described in terms of the FIG. 2 and FIG. 4 embodiment. It will be understood that they can be used in other embodiments of the invention and in locking assemblies which are in the prior art or invented by others in the future.

Figure 11:
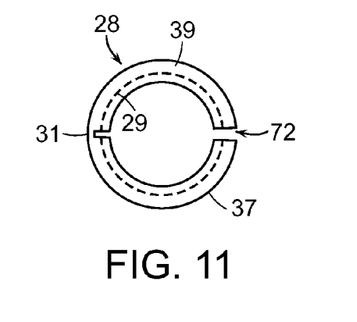
FIG. 11 is an end view of split sleeve with a living hinge.
Figure 11A:
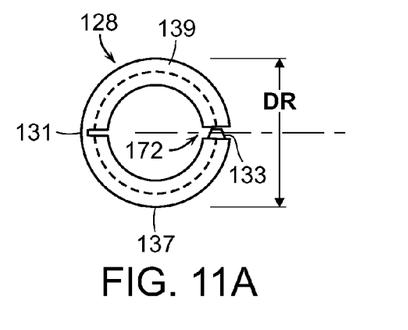
FIG. 11A is an end view of a split sleeve having resilient spring like members at the location of the split.

Preferably, sleeve 28 having internal female threads 29, is formed as a molded resilient-plastic structure having a so-called living hinge 31, which is a thin section capable of bending in simulation of a pinned hinge. See FIG. 11. The threaded two half cylinders 37, 39, connected by living hinge 31, are swung together to form sleeve 28, having lengthwise gap or split 72, as shown in FIG. 11. The split both enables initial placement of the sleeve around the screw body 36, and allows it to expand in dimension as it moves toward the larger diameter end of screw 38. As described in related application Ser. No. 13/420,937, and as shown in FIG. 11A, sleeve 128 has a living hinge 131 connecting half cylinders 137, 139. Small molded cones 133 at the split 172 must be compressed when the sleeve is placed within a tube, and thus they cause the sleeve to have an diametrically outward bias. That is, the diameter DR of the sleeve prior to placement with a tube assembly is larger than the bore of the large diameter tube which receives the locking assembly and its associated sleeve. When the sleeve is not made of resilient plastic material, coil springs or the like may be used. The spring bias enhances the frictional engagement of the sleeve with the bore of a tube when it is on a portion of the screw which does not force it against the bore.

Figure 12:
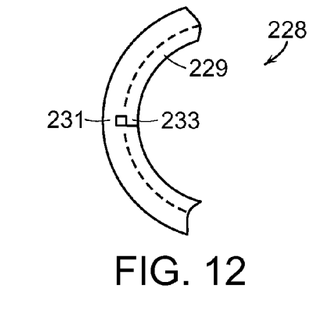
FIG. 12 is a detail partial end view, showing the living hinge portion of the sleeve of FIG. 11.
Figure 13:
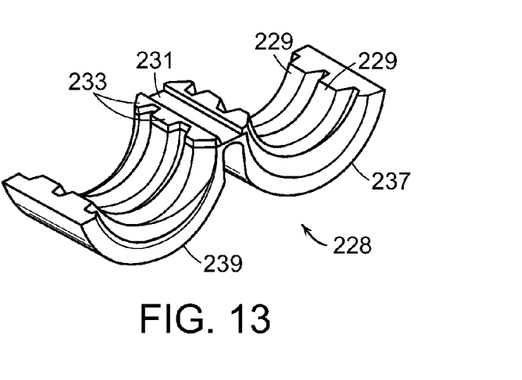
FIG. 13 shows the sleeve of FIG. 11 in an opened position.

FIG. 12 shows a portion of sleeve 228 which has the features of sleeve 28, including a living hinge 231 and internal threads 229. Sleeve 228 is shown in the fully open position in FIG. 13. Sleeve 228 has one or more pads 233 which act like the cones 133. They are on one or both halves 239, 237 at the hinge joint location, and serve to resist full closing of the hinge. The pads may comprise resilient material of which the sleeve is comprised, or other spring like inserts into cavities at the hinge location. Thus, when sleeve 228 is put into the bore of the larger tube of the rod assembly, compression of the outside of the sleeve is needed, and that compresses the elastic pads 233. Thus there is a residual outward elastic force applied by the sleeve to the bore of the tube, which creates a frictional engagement of the sleeve with the bore when the sleeve is at the small diameter end of the screw of the assembly 20, or in vicinity of the unthreaded shaft portion in other embodiments of the invention. Thus, the sleeve rotates when the outer tube is rotated relative to the inner tube, even if the screw on which it is mounted is not forcing it into contact with the bore of the tube. Pad(s) 233 may be flat buttes as shown, or may have other shape, for instance, they may be cones or have more complicated shapes.

Figure 14:
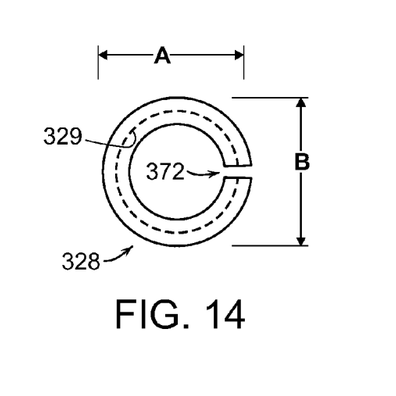
FIG. 14 is an end view of an oblong sleeve.

FIG. 14 shows another embodiment of a sleeve, namely sleeve 328 which is fabricated so it oblong: diameter A is less than the diameter of the bore of the larger tube and diameter B is greater than said tube diameter. Thus, sleeve 328 has to be distorted to a circular shape when inserted into the bore of the larger tube, whereupon there is residual elastic outward force against the bore. Sleeve 328 may alternatively be made without split 172, as shown in FIG. 14. If there is no split, sleeve 328 may be made of an elastomeric material, e.g., rubber, which has sufficient elasticity to enable the sleeve to be stretched, rather than split apart, as it moves along the screw to the larger diameter end of the screw.

Figure 15:
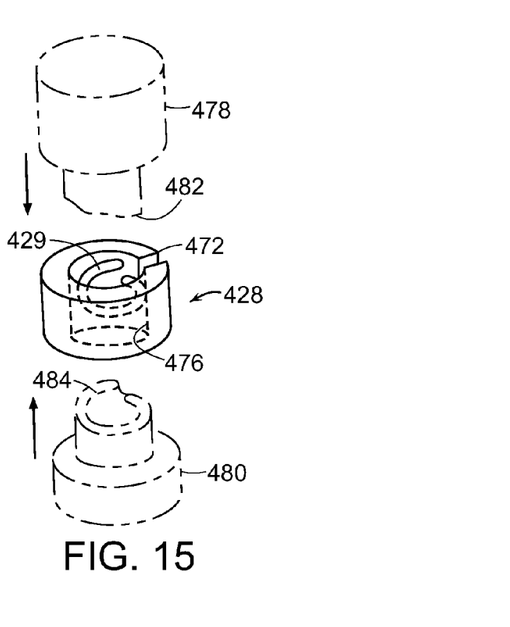
FIG. 15 shows a sleeve having a single turn thread in combination with simplified molding dies.

FIG. 15 shows another embodiment of sleeve which can be made with low cost tooling. Sleeve 428 has a longitudinal split 472 and a bore 476 having a single turn thread 429, shaped to engage the thread of a screw of a screw body of a locking mechanism. Shown in sketch-phantom are injection molding or compression molding dies, namely male dies 478, 480 which as indicated by the arrows translate to and from each other within the cavity of a female die piece, not shown, which defines the exterior of the sleeve. Each die 478, 480 has a respective surface 482, 484 which defines one side of the thread 429. In use, the dies 478, 480 are moved into close proximity to each other and plastic is either injected into the die cavity or is compressed by the die movements. After the plastic has solidified into the desired sleeve 428, because the thread is single-turn, no rotation of dies is necessary for extraction of the dies from the part, as would be the case if the thread had multiple turns.

While the examples of the invention have been in connection a window frame, the invention may be used in other applications. For instance, the invention may be used in connection with shower rods, and pole caddies used in shower enclosures. And the invention may be used for vertical poles, for example as used for supporting lamps and other things between a floor and ceiling; or for preventing lateral motion of things contained on shelves; or in articles with variable length legs, such as tripods for video devices, cameras and the like.

The invention, with explicit and implicit variations and advantages, has been described and illustrated with respect to one or more embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail without departing from the spirit and scope of the claimed invention.

What is claimed is:

1. A rod assembly, for supporting a curtain or other treatment at an architectural opening in a structure, which comprises:
   a tube assembly comprising
      (i) a first tube having a bore, a first end and a second end;
      (ii) a second tube, smaller in diameter than the first tube and having a bore, a first end and a second end, the first end partially positioned within the bore of the first tube at the first end thereof;
      wherein the first and second tubes are rotatable relative to each other and telescopable relative to each other to enable change in overall length of the tube assembly; and,
   a locking assembly, contained within the tube assembly proximate the first end of the second tube, comprising
      (i) a screw body having a first end and an opposing second end, the second end fastened to the first end of the second tube; the screw body comprising an integral screw, the screw optionally tapered or of constant diameter, the screw running lengthwise within the body and connected to said first screw body end or said second screw body end, the screw comprising a thread having pitch and a thread profile; and
      (ii) a sleeve having a threaded bore circumscribing at least part of the length of said screw and threadingly engaged therewith, the sleeve having an exterior surface portion frictionally engageable with the bore of the first tube;
   wherein rotation of one tube relative to the other tube causes the sleeve to move lengthwise along said screw length toward one of said screw body ends, wherein the screw threads at a portion of the length of the screw expand the sleeve radially outwardly so the sleeve frictionally engages the bore of the first tube, thereby locking the telescoped tubes lengthwise with respect to each other;
   wherein, at said portion of the screw length where sleeve is expanded radially outwardly to frictionally engage and lock the telescoped tubes the thread of the screw changes in pitch or in size of thread profile with distance from the screw body end to which the screw is connected.

2. The rod assembly of claim 1 further comprising a plain or partially threaded shaft connecting the screw to the other of said screw body ends.

3. The rod assembly of claim 2 further comprising a conical transition section where the screw is connected to said shaft.

4. The rod assembly of claim 2 wherein the screw has a constant diameter.

5. The rod assembly of claim 1 wherein the screw has a constant diameter.

6. The rod assembly of claim 1 wherein the screw diameter increases with proximity of the thread to the end of the screw body to which the screw is connected.

7. The rod assembly of claim 1 wherein the screw diameter decreases with proximity of the thread to the end of the screw body to which the screw is connected.

8. The rod assembly of claim 1 wherein the pitch of the screw thread decreases with proximity of the thread to the end of the screw body to which the screw is connected.

9. The rod assembly of claim 1 wherein the size of the thread profile of the screw increases with proximity of the thread to the end of the screw body to which the screw is connected.

10. The rod assembly of claim 1 further comprising: a first bracket and a second bracket, each shaped for contacting a spaced apart portion of said structure which defines at least a portion of said opening, each bracket having a portion shaped for receiving a second end of one of the tubes; wherein the second end of the first tube is engaged with the tube-receiving portion of the first bracket and the second end of the second tube is engaged with the tube-receiving portion of the second bracket.

11. The rod assembly of claim 1 wherein the sleeve has a lengthwise split and is selected from a group of sleeves which comprises (a) a sleeve having a living hinge; (b) a sleeve have a living hinge and one or more resilient pads at the location of the living hinge; (c) a sleeve have a living hinge and one or more resilient pads at the location of the lengthwise split; (d) a sleeve which is oblong in cross section, with one oblong dimension which is larger than the diameter of the bore of the first tube when the sleeve is unconstrained by said bore; and (e) a sleeve having a single turn thread.

12. A locking assembly for use in locking together a tube assembly comprised of a first tube and a smaller diameter second tube, where the tubes are rotatable and telescopable relative to each other, for changing the overall length of the tube assembly, comprising:
   (i) a screw body having a first end and an opposing second end, the second end shaped for fastening to the first end of a second tube; the screw body comprising an integral screw, the screw optionally tapered or of constant diameter, the screw running lengthwise within the body and connected to said first screw body end or said second screw body end, the screw comprising a thread having a pitch and a thread profile; wherein a portion of the length of the thread of the screw changes in pitch or in size of thread profile with distance from the screw body end to which the screw is connected; and
   (ii) a sleeve, having a threaded bore circumscribing at least part of the length of said screw and threadingly engaged therewith, the sleeve having an exterior surface configured for frictional engagement with the bore of said first tube;
   wherein during use the sleeve moves to or from vicinity of said first end of the screw body due to rotation of the sleeve about the screw, and the sleeve expands or contracts in outside dimension, wherein the sleeve expands radially outward due to mismatch between the configuration of said threaded bore and the pitch and size of thread profile at said portion of the screw.

13. The locking assembly of claim 12 further comprising a plain or partially threaded shaft connecting the screw to the other of said screw body ends.

14. The locking assembly of claim 13 further comprising a conical transition section where the screw is connected to said shaft.

15. The locking assembly of claim 12 wherein the screw has a constant diameter.

16. The locking assembly of claim 12 wherein the screw diameter increases with proximity of the thread to the end of the screw body to which the screw is connected.

17. The locking assembly of claim 12 wherein the screw diameter decreases with proximity of the thread to the end of the screw body to which the screw is connected.

18. The locking assembly of claim 12 wherein the pitch of the screw thread increases with proximity of the thread to the end of the screw body to which the screw is connected.

19. The locking assembly of claim 12 wherein the size of the thread profile of the screw increases with proximity of the thread to the end of the screw body to which the screw is connected.

20. A method of positioning and locking a tube assembly within an architectural opening in a structure, wherein the tube assembly is comprised of a first tube and a smaller diameter second tube, the first tube having a bore, a first end, and a second end; the second tube having a bore, a first end and a second end, the first end partially positioned within the bore of the first end of the first tube;

wherein the tubes are rotatable and telescopable relative to each other for changing the overall length of the tube assembly;

wherein a locking assembly is contained within the tube assembly in vicinity of the location of where the second tube fits within the first tube, the locking assembly comprising:

(i) a screw body having a first end; an opposing second end, the second end fastened to the first end of the second tube; the screw body comprising a screw connected to one of said screw body ends; the screw optionally tapered or of constant diameter and running lengthwise within the screw body, the screw comprising a thread having a thread profile and a pitch, the screw optionally connected to the other of said screw body ends by a wholly or partially unthreaded shaft; wherein the screw has a first thread portion which changes in pitch or in thread profile with distance from the end of the screw body to which the screw is connected;

(ii) a sleeve, circumscribing said screw, the sleeve having a threaded bore and an exterior surface portion configured for frictional engagement with the bore of the first tube; wherein the sleeve is threadingly engaged with the screw and thereby movable along the screw when the screw is rotated and the exterior surface of the sleeve is restrained from moving by frictional engagement with the bore of the first tube; and wherein the sleeve further comprises one of (a) a lengthwise split, a diametrically opposed living hinge; (b) a lengthwise split, a diametrically opposed living hinge and resilient pads at the living hinge location; (c) a lengthwise split, a diametrically opposed living hinge and resilient pads the split location; (d) a living hinge and an oblong cross section; and (e) a single turn thread within said bore;

which method comprises:

telescoping the tube assembly to change the length thereof so the tube assembly fits within an architectural opening or runs between two brackets adjacent an architectural opening;

rotating the first tube and second tube relative to each other so that said frictional engagement of the sleeve with the bore of the first tube causes rotation of the sleeve and resultant lengthwise movement of the sleeve along said screw to said first thread portion, wherein the interaction of the sleeve threaded bore with the first thread portion causes the sleeve to expand radially outwardly with increased force against the bore of the first tube until the tubes become locked against relative rotation and telescoping, wherein during said movement of the sleeve a lengthwise thrusting force is imparted to the tubes to increase or decrease the length of the tube assembly as they become locked.

\* \* \* \* \*